(12) United States Patent
Kaga

(10) Patent No.: US 7,125,118 B2
(45) Date of Patent: Oct. 24, 2006

(54) PROGRESSIVE MULTIFOCAL LENS AND METHOD OF DESIGNING THE SAME

(75) Inventor: Tadashi Kaga, Nagano ken (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 10/509,601

(22) PCT Filed: Apr. 1, 2004

(86) PCT No.: PCT/JP2004/004802

§ 371 (c)(1),
(2), (4) Date: Sep. 28, 2004

(87) PCT Pub. No.: WO2004/090615

PCT Pub. Date: Oct. 21, 2004

(65) Prior Publication Data

US 2005/0146682 A1    Jul. 7, 2005

(30) Foreign Application Priority Data

Apr. 2, 2003  (JP)  ............................. 2003-099623
Apr. 2, 2003  (JP)  ............................. 2003-099624

(51) Int. Cl.
G02C 7/06  (2006.01)
(52) U.S. Cl. ...................................... 351/169; 351/177

(58) Field of Classification Search ................. 351/169
See application file for complete search history.

(56) References Cited

U.S. PATENT DOCUMENTS 6,019,470 A *  2/2000  Mukaiyama et al. ....... 351/169
6,149,271 A *  11/2000  Menezes et al. ............ 351/169
6,220,704 B1 *  4/2001  Mukaiyama et al. ....... 351/169

FOREIGN PATENT DOCUMENTS

| JP | 2002-122822 A | 4/2002 |
| JP | 2002-520674 A | 7/2002 |
| JP | 2002-372689 A | 12/2002 |
| WO | WO97/019382 A | 5/1997 |

* cited by examiner

Primary Examiner—Jordan M. Schwartz
(74) Attorney, Agent, or Firm—Sughrue Mion, PLLC

(57) ABSTRACT

To provide a new progressive multifocal lens having eyesight corrective power and astigmatism corrective power in the same refracting interface by forming an eyeball-side refracting interface 2 or an object-side refracting interface 3 into a curved surface denoted by a combined refracting interface 14+15 composed of an original progressive refracting interface 14 set only to exhibit a desired eyesight corrective characteristic and an original toric surface 15 set only to exhibit a desired astigmatism corrective characteristic with a combination expression denoted by combination expression (1) or (2).

8 Claims, 11 Drawing Sheets

PROGRESSIVE MULTIFOCAL LENS AND METHOD OF DESIGNING THE SAME

TECHNICAL FIELD

The present invention relates to a progressive multifocal lens having eyesight corrective power and astigmatism corrective power and relates to a method for designing the same.

BACKGROUND ART

Progressive multifocal lenses include two visual fields of different refractive powers and a visual field with progressively varying refractive power therebetween, in which the visual fields have no boundary therebetween, which has good appearance, and which provides visual fields of different refractive powers with a single lens. Accordingly, the progressive multifocal lenses are often used as eyeglass lenses having the power of correcting eyesight such as farsightedness. FIG. 11(a) shows a general structure of a conventional progressive multifocal lens which is commonly used as an eyeglass lens. The progressive multifocal lens 100 has a distance portion 11 serving as a visual field for viewing a far object at the upper part and a near portion 12 serving as a visual field with a power different from that of the distance portion 11 for viewing a near object below the distance portion 11. The distance portion 11 and the near portion 12 are smoothly communicated with each other through a progressive portion 13 serving as a visual field having a refractive power that varies continuously for viewing the intermediate object between a long distance and a short distance. As shown in FIG. 11(b), it is necessary for a single-plate lens used for eyeglasses to provide all functions required for eyeglasses such as vertex power that corresponds to the degree of user's eyes, cylindrical power for correcting astigmatism, addition power for correcting farsightedness, and prismatic power for correcting heterophoria with two refracting interfaces of an eyeball-side refracting interface 2 and a target object-side refracting interface 3. Accordingly, as shown in FIG. 11(b), in a conventional progressive multifocal lens 100a, a progressive refracting interface 14 having refractive power that varies continuously because of the distance portion 11, the near portion 12, and the progressive portion 13 is formed in the object-side refracting interface 3 and the eyeball-side refracting interface 2 is used as an astigmatism-correcting toric surface 15 etc. In contrast to the conventional progressive multifocal lens 100a, in order to provide a progressive multifocal lens in which the blurring or distortion of an image due to the variation in magnification of the distance portion 11 and the near portion 12 of the progressive multifocal lens is improved, the applicant has developed a so-called internal progressive multifocal lens 100b having a progressive refracting interface on the eyeball-side refracting interface 2 in view of the arrangement of the progressive refracting interface of the magnification factor of the progressive multifocal lens. The invention is described in WO 97/19382. The internal progressive multifocal lens 100b described in WO 97/19382 can reduce the difference in magnification between the distance portion and the near portion, thereby greatly reducing the resulting blurring and distortion. Since the internal progressive multifocal lens 100b has the progressive refracting interface 14 in the eyeball-side refracting interface 2, the astigmatism-correcting toric surface 15 can be combined to the eyeball-side refracting interface 2. The internal progressive multifocal lens 100b which has an eyesight corrective characteristic and an astigmatism corrective characteristic in the eyeball-side refracting interface 2 can reduce the difference in magnification between the distance portion and the near portion to a necessary minimum, having little image blurring and distortion, and being capable of correcting astigmatism, thereby providing a more comfortable visual field to users with astigmatism. The progressive multifocal lens 100b of which eyeball-side refracting interface 2 is given the eyesight corrective characteristic and the astigmatism corrective characteristic can be designed by a designing method including a first step of obtaining a progressive refracting interface (hereinafter, referred to as an original progressive refracting interface) only in order that the eyeball-side refracting interface exhibits a desired eyesight corrective characteristic, a second step of obtaining a toric surface (hereinafter, referred to as an original toric surface) only in order that the eyeball-side refracting interface exhibits a desired astigmatism corrective characteristic, and a third step of obtaining the eyeball-side refracting interface of the progressive multifocal lens from the original progressive refracting interface and the original toric surface. The above-described WO 97/19382 proposes a combination expression by which the original progressive refracting interface and the original toric surface are integrated with each other in the third step.

The progressive multifocal lens 100b in which the progressive refracting interface 14 and the toric surface 15 are combined in the eyeball-side refracting interface 2 with the combination expression proposed in WO 97/19382 is not subjected to interference with eyesight corrective power for correcting astigmatism almost all the region of a principal fixation line 16 and ensures astigmatism remarkably stably, as in the conventional progressive multifocal lens 100a.

The toric surface is defined as a surface that has the maximum power in a certain meridian plane and the minimum power in a meridian plane perpendicular to that and has different curvature radii in planes intersecting at right angles. However, the meridian plane with the maximum power and the meridian plane with the minimum power are in circular arc shape in cross section and the shape of the curve therebetween is not particularly determined. Briefly, the kinds of the shape of the toric surface are limitless. Although the combination expression proposed in WO 97/19382 has the advantage of relatively easy calculation, it only combines the toric surface with the assumption that the curvature in the x-axis direction and the curvature in the y-axis direction are each fixed.

Accordingly, providing another combination expression that expresses the shape of the toric surface will provide a combined refracting interface composed of the progressive refracting interface and the toric surface which has more excellent astigmatism corrective power.

The present invention has been made in consideration of the above problems. Accordingly, an object of the invention is to provide a new progressive multifocal lens having eyesight corrective power and astigmatism corrective power in the same refracting interface by providing a new combination expression for combining a progressive refracting interface and a toric surface.

Another object of the invention is to provide a method for designing such a progressive multifocal lens.

DISCLOSURE OF THE INVENTION

A progressive multifocal lens according to the present invention has a combined refracting interface in the eyeball-side refracting interface or in the object-side refracting interface, the combined refracting interface being obtained by using an expression that distributes the interpolation between the circular arcs of a toric surface in which the cross section in the direction of the cylinder axis and the cross section perpendicular to the cylinder axis are each in circular arc shape and combination expression (1) or (2) that combines the toric surface with the progressive surface. The progressive refracting interface can be designed by a designing method including a first step of obtaining a progressive refracting interface (hereinafter, referred to as an original progressive refracting interface) only to provide a desired eyesight corrective characteristic, a second step of obtaining a toric surface (hereinafter, referred to as an original toric surface) only to provide a desired astigmatism corrective characteristic, and a third step of obtaining a combined refracting interface from combination expression (1) or (2) that combines the original toric surface of which arcs are interpolated with the curvature distributed in a sine curve and the original progressive refracting interface together.

Accordingly, the invention according to claim 1 provides a progressive multifocal lens for correcting eyesight having a progressive refracting interface in a refracting interface on the side of an eyeball or a refracting interface on the side of an object, the progressive refracting interface including a distance portion and a near portion with different refractive powers and a progressive portion of which refractive power varies progressively therebetween, wherein the progressive multifocal lens is characterized in that the eyeball-side refracting interface:or the object-side refracting interface is a combined refracting interface composed of an original progressive refracting interface set only to exhibit a desired eyesight corrective characteristic and an original toric surface set only to exhibit a desired astigmatism corrective characteristic, and when the z-axis is an axis passing through the center of the progressive refracting interface from the object toward the eyeball, the x-axis is the cylinder axis of the original toric surface, and the y-axis is an axis perpendicular to the x-axis and the z-axis, value $z_p$ in any point P $(x_p, y_p, z_p)$ in the combined refracting interface is expressed by expression (1) or (2) by using the approximate curvature $C_p$ of the original progressive refracting interface, curvature Cx in the x-axis direction, and curvature Cy in the y-axis direction.

[Numerical Formula 5]

$$z_p = \frac{(c_p + c_x)x^2 + (c_p + c_y)y^2}{1 + \sqrt{1 - \frac{((c_p + c_x)x^2 + (c_p + c_y)y^2)^2}{x^2 + y^2}}} \quad (1)$$

[Numerical Formula 6]

$$z_p = \frac{(c_p + c_x)x^2}{1 + \sqrt{1 - (c_p + c_x)^2(x^2 + y^2)}} + \frac{(c_p + c_y)y^2}{1 + \sqrt{1 - (c_p + c_y)^2(x^2 + y^2)}} \quad (2)$$

The invention according to claim 2 provides a progressive multifocal lens according to claim 1, characterized in that the eyeball-side refracting interface or the object-side refracting interface opposite to the surface having the combined refracting interface is spherical or rotation-symmetry aspherical in shape.

The invention according to claim 3 provides a method for designing a progressive multifocal lens for correcting eyesight having a progressive refracting interface in a refracting interface on the side of an eyeball or a refracting interface on the side of an object, the progressive refracting interface including a distance portion and a near portion with different refractive powers and a progressive portion of which refractive power varies progressively therebetween, wherein the method is characterized by including a first step of obtaining an original progressive refracting interface only in order that the eyeball-side refracting interface or the object-side refracting interface exhibits an eyesight corrective characteristic, a second step of obtaining an original toric surface only in order that the eyeball-side refracting interface or the object-side refracting interface exhibits a desired astigmatism corrective characteristic, and a third step of obtaining a combined refracting interface as the eyeball-side refracting interface or the object-side refracting interface, the combined refracting interface being composed of the original progressive refracting interface set only to exhibit a desired eyesight corrective characteristic and the original toric surface set only to exhibit a desired astigmatism corrective characteristic, wherein in the third step, when the z-axis is an axis passing through the center of the progressive refracting interface from the object toward the eyeball, the x-axis is the cylinder axis of the original toric surface, and the y-axis is an axis perpendicular to the x-axis and the z-axis, value $z_p$ in any point P $(x_p, y_p, z_p)$ in the combined refracting interface is obtained by expression (1) or (2) by using the approximate curvature Cp of the original progressive refracting interface, curvature Cx in the x-axis direction, and curvature Cy in the y-axis direction.

[Numerical Formula 7]

$$z_p = \frac{(c_p + c_x)x^2 + (c_p + c_y)y^2}{1 + \sqrt{1 - \frac{((c_p + c_x)x^2 + (c_p + c_y)y^2)^2}{x^2 + y^2}}} \quad (1)$$

[Numerical Formula 8]

$$z_p = \frac{(c_p + c_x)x^2}{1 + \sqrt{1 - (c_p + c_x)^2(x^2 + y^2)}} + \frac{(c_p + c_y)y^2}{1 + \sqrt{1 - (c_p + c_y)^2(x^2 + y^2)}} \quad (2)$$

INDUSTRIAL APPLICABILITY

The present invention relates to a progressive multifocal lens that has eyesight corrective power and astigmatism corrective power and relates to a method for designing the same. The invention, however, is not limited to that.

BRIEF DESCRIPTION OF THE DRAWINGS

[FIG. 1] FIG. 1 shows the schematic structure of a progressive multifocal lens according to the present invention, wherein

FIG. 2 is a graph describing that the curvature is distributed in terms of a sine curve.

FIG. 3 is a distribution chart of the eyeball-side z-coordinate of a progressive multifocal lens of a first embodiment.

[FIG. 4]

FIG. 5 is a distribution chart of the eyeball-side z-coordinate of a progressive multifocal lens of a second embodiment.

[FIG. 6]

FIG. 7 is a distribution chart of the eyeball-side z-coordinate of a progressive multifocal lens of a third embodiment.

[FIG. 8]

FIG. 9 is a distribution chart of the eyeball-side z-coordinate of a progressive multifocal lens of a fourth embodiment.

[FIG. 10]

[FIG. 11] FIG. 11 shows the schematic structure of a conventional progressive multifocal lens, wherein

BEST MODE FOR CARRYING OUT THE INVENTION

While embodiments of a progressive multifocal lens according to the present invention and a method for designing the same will be described hereinafter, it is to be understood that the invention is not limited to the following embodiments.

The progressive multifocal lens of the invention has a progressive refracting interface that has a distance portion and a near portion having different refractive powers and a progressive portion of which power varies progressively therebetween in the eyeball-side refractive interface or the object-side refractive interface.

Figure 1A:
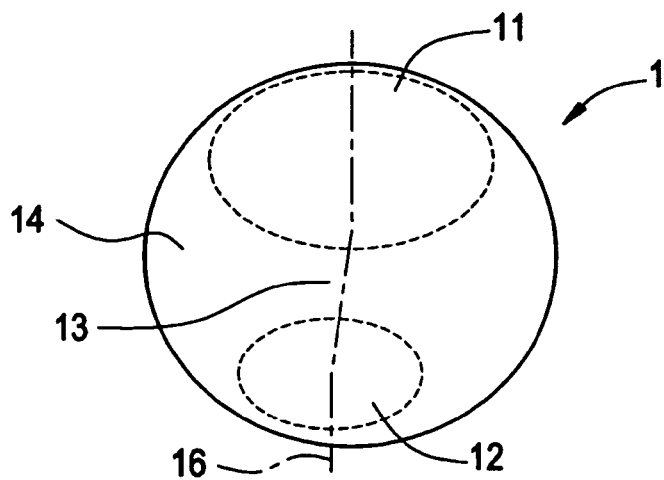
FIG. 1(a) is a front view.

As shown in FIG. 1(a), a progressive multifocal lens 1 of the invention has a distance portion 11 serving as a visual field for viewing a far object at the upper part and a near portion 12 serving as a visual field having power different from that of the distance portion 11 for viewing a near object below the distance portion 11. The distance portion 11 and the near portion 12 are smoothly communicated with each other through a progressive portion 13 serving as a visual field having power that varies continuously for viewing an intermediate object between a long distance and a short distance.

Figure 1B:
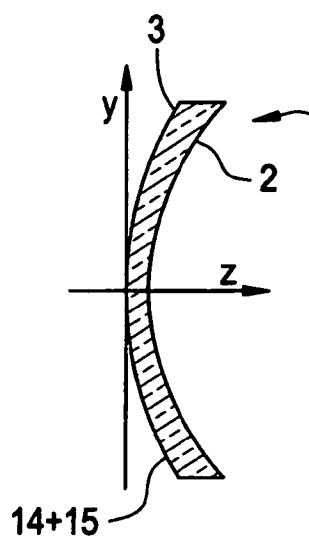
FIG. 1(b) is a cross-sectional view of an object-side refracting interface having a refracting interface.
Figure 1C:
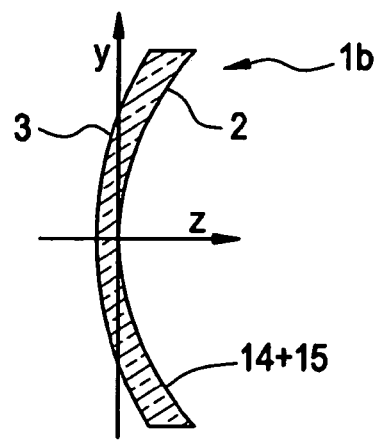
FIG. 1(c) is a cross-sectional view of an eyeball-side refracting interface having a combined refracting interface.
Figure 1D:
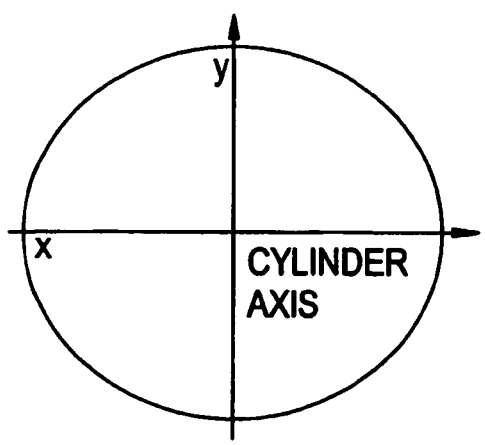
FIG. 1(d) is a plan view showing that the x-coordinate agrees with the cylinder axis.

The progressive multifocal lens of the invention may be an external progressive multifocal lens 1a which has a progressive refracting interface 14 including the distance portion 11, the near portion 12, and the progressive portion 13 in an object-side refracting interface 3 (also referred to as a convex surface or an outer surface), as shown in FIG. 1(b). Alternatively, it may be an internal progressive multifocal lens 1b which has the progressive refracting interface 14 in an eyeball-side refracting interface 2 (also referred to as a concave surface or an inner surface), as shown in FIG. 1(c).

With the internal progressive multifocal lens 1b, the difference in magnification between the distance portion 11 and the near portion 12 can be reduced more than the progressive multifocal lens 1a having the progressive refracting interface 14 in the outer surface and as such, resulting blurring and distortion of an image can be significantly reduced. When the eyeball-side refracting interface 2 is given the curvature of the progressive refracting interface, the curvature (the reciprocal of the curvature radius) of the progressive refracting interface along a principal fixation line 16 is smaller in the near portion 12 than in the distance portion 11. At least part of the distance portion 11 has a smaller curvature of the progressive refracting interface with distance from the principal fixation line 16. On the other hand, at least part of the near portion 12 has a larger curvature of the progressive refracting interface with distance from the principal fixation line 16.

It is desirable for the progressive refracting interface 14 to have the minimum astigmatism in forming a progressive refracting interface on the principal fixation line 16. Therefore, it is preferable that the curvature of the progressive refracting interface be equal in two perpendicular directions in at least part of the principal fixation line 16.

In the progressive multifocal lens 1 of the invention, one of the object-side refracting interface 3 and the eyeball-side refracting interface 2 is constructed of a combined refracting interface 14+15 having both of the eyesight corrective power and the astigmatism corrective power. With the external progressive multifocal lens 1a, shown in FIG. 1(b), the eyeball-side refracting interface 2 opposite to the combined refracting interface 14+15 provided in the object-side refracting interface 3 is spherical or rotational-symmetry aspherical in shape. With the internal progressive multifocal lens 1b, shown in FIG. 1(c), the object-side refracting interface 3 opposite to the combined refracting interface 14+15 provided in the eyeball-side refracting interface 2 is spherical or rotational-symmetry aspherical in shape. When the combined refracting interface 14+15 is provided in the eyeball-side refracting interface 2, astigmatism can be corrected and also the difference in magnification between the distance portion 11 and the near portion 12 can be reduced to a necessary minimum, as described above, thus providing a more comfortable visual field to a user with astigmatism because of less image blurring and distortion.

The designing of the progressive multifocal lens of which one refracting interface has both of the eyesight corrective power and the astigmatism corrective power can be performed by a first step of obtaining a progressive refracting interface (hereinafter, referred to as an original progressive refracting interface) set only in order to exhibit a desired eyesight corrective characteristic, a second step of forming a toric surface (hereinafter, referred to as an original toric surface) only in order that the eyeball-side refracting interface 2 or the object-side refracting interface 3 exhibits a desired astigmatism corrective characteristic, and a third step of obtaining a combined refracting interface from the original progressive refracting interface and the original toric surface with combination expression.

In the first step, an original progressive refracting interface is obtained with a parameter according to the circumstances such as the degree of far sightedness of a user and how the eyeglasses are used and the result is stored as coordinates or curvature.

In the second step, an original toric surface is obtained with the assumption of a surface of which curvature is distributed in a sine curve as interpolation between circular arcs in which the cross section along the cylinder axis and the cross section in the direction perpendicular to the cylinder axis are each in the form of a circular arc.

In the third step, a combined refracting interface in which the original progressive refracting interface and the original toric surface are combined is obtained by the following combination expression (1) or (2):

[Numerical Formula 9]

$$z_p = \frac{(c_p+c_x)x^2 + (c_p+c_y)y^2}{1+\sqrt{1-\frac{((c_p+c_x)x^2+(c_p+c_y)y^2)^2}{x^2+y^2}}} \quad (1)$$

[Numerical Formula 10]

$$z_p = \frac{(c_p+c_x)x^2}{1+\sqrt{1-(c_p+c_x)^2(x^2+y^2)}} + \frac{(c_p+c_y)y^2}{1+\sqrt{1-(c_p+c_y)^2(x^2+y^2)}} \quad (2)$$

When the axis passing through the center of the progressive refracting interface from the object toward the eyeball is z-axis, the direction of cylinder axis is x-axis, and the axis perpendicular to the z-axis and the x-axis is y-axis in the state of wearing the eyeglasses, as shown in FIGS. 1(b), (c), and (d), $z_p$ denotes the z-coordinate perpendicular to the object-side or the eyeball-side refracting interface. For the object-side refracting interface 3, the point at which the object-side refracting interface 3 and the z-axis intersect each other is the origin and, for the eyeball-side refracting interface 2, the point at which the eyeball-side refracting interface 2 and the z-axis intersect each other is the origin.

Curvature Cp is an approximate curvature in any point P ($x_p$, $y_p$, $z_p$) in the original progressive refracting interface. Curvature Cx is the curvature in the direction of x-axis. Curvature Cy is the curvature in the direction of y-axis. For the approximate curvature Cp, for example, a radial mean curvature can be adopted, which is the reciprocal of the radius of a circle that passes through three points of any point P ($x_p$, $y_p$, $z_p$) on the original progressive refracting interface, point P' ($-x_p$, $-y_p$, $-z_p$) which is in rotational symmetry with point p, and the inner vertex (0, 0, 0) or the outer vertex (0, 0, 0) in the xy-plane including the point P and perpendicular to the z-axis (passing through the lens center or the inner vertex (0, 0, 0)).

Figure 2:
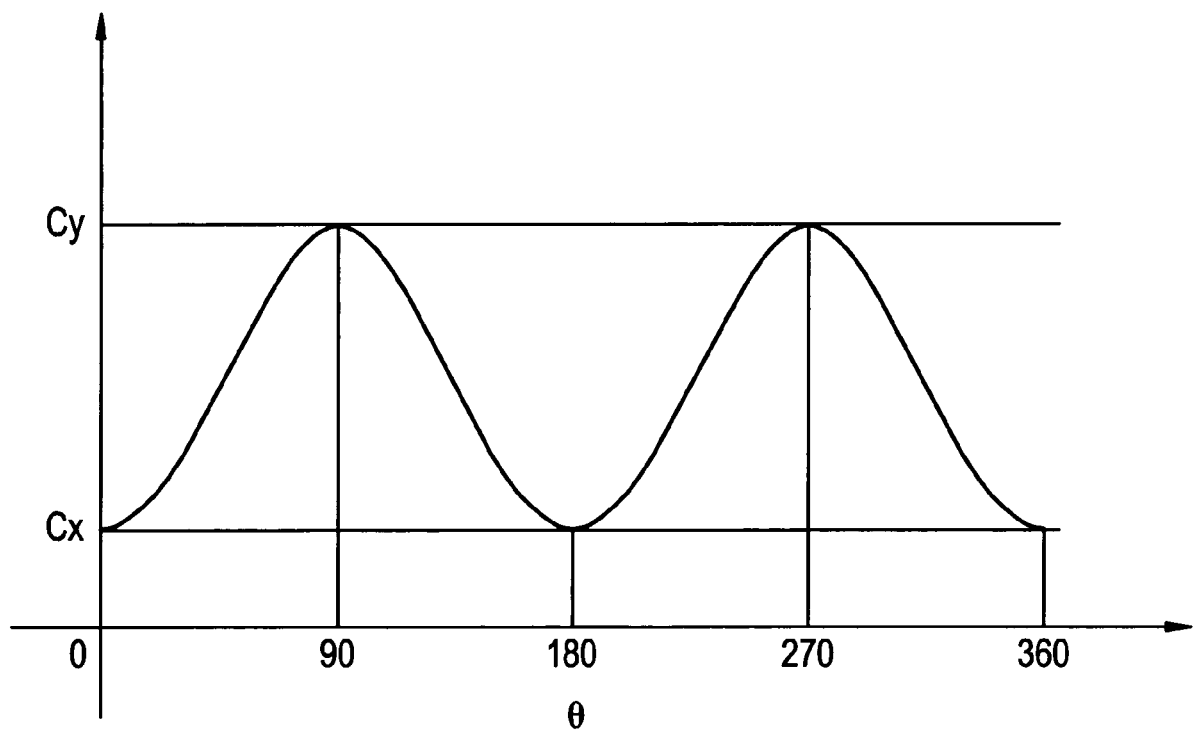
[FIG. 2]

The procedure of calculating the above-mentioned combination expression (1) will now be described. Suppose interpolation with such a sine curve that the curvature Cx in the x-axis direction is obtained at zero degree, 180 degrees, and 360 degrees; curvature Cy in the Y-axis direction is obtained at 90 degrees and 270 degrees, shown in FIG. 2. This is expressed as

[Numerical Formula 11]

$$c(\theta) = c_y + \left(\frac{1+\cos 2\theta}{2}\right)(c_x - c_y)$$

This formula is modified as

[Numerical Formula 12]

$$c(\theta) = c_y + \left(\frac{1+\cos^2\theta - \sin^2\theta}{2}\right)(c_x - c_y) = c_y +$$

$$\left(\frac{\cos^2\theta + \sin^2\theta + \cos^2\theta - \sin^2\theta}{2}\right)(c_x - c_y)$$

$$= c_y + \left(\frac{2\cos^2\theta}{2}\right)(c_x - c_y) = c_y + \cos^2\theta(c_x - c_y)$$

$$= c_y + c_x\cos^2\theta - c_y\cos^2\theta$$

$$= c_x\cos^2\theta + c_y(1-\cos^2\theta) = c_x\cos^2\theta + c_y\sin^2\theta$$

This formula is converted to the x- and y-coordinates as

[Numerical Formula 13]

$$\cos\theta = \frac{x}{\sqrt{x^2+y^2}}, \sin\theta = \frac{y}{\sqrt{x^2+y^2}}$$

Accordingly, one obtains expression (3).

[Numerical Formula 14]

$$c_{(x,y)} = \frac{c_x x^2 + c_y y^2}{x^2 + y^2} \quad (3)$$

Assume a surface as a toric surface, of which curvature is distributed in a sine curve as interpolation between circular arcs in which the cross section along the cylinder axis and the cross section in the direction perpendicular to the cylinder axis are each in the form of a circular arc. Since the z-coordinate denotes a circular arc with a distance from the center of a curvature $c_{(x, y)}$,

[Numerical Formula 15]

$$\sqrt{x^2+y^2}$$

the z-coordinate can be expressed by expression (4) which represents the circular arc.

[Numerical Formula 16]

$$z = \frac{c_{(x,y)}(x^2+y^2)}{1+\sqrt{1-c_{(x,y)}^2(x^2+y^2)}} \quad (4)$$

Substituting expression (3) into expression (4) gives expression (5).

[Numerical Formula 17]

$$z = \frac{\left(\frac{c_x x^2 + c_y y^2}{x^2 + y^2}\right)(x^2 + y^2)}{1 + \sqrt{1 - \left(\frac{c_x x^2 + c_y y^2}{x^2 + y^2}\right)^2 (x^2 + y^2)}} = \frac{c_x x^2 + c_y y^2}{1 + \sqrt{1 - \frac{(c_x x^2 + c_y y^2)^2}{x^2 + y^2}}} \quad (5)$$

The surface expressed by expression (5) is the original toric surface. Combining $C_p$ to each of $c_x$ and $c_y$ gives following combination expression (1).

[Numerical Formula 18]

$$z_p = \frac{(c_p + c_x)x^2 + (c_p + c_y)y^2}{1 + \sqrt{1 - \frac{((c_p + c_x)x^2 + (c_p + c_y)y^2)^2}{x^2 + y^2}}} \quad (1)$$

When the coordinate system of the original progressive refracting interface and the coordinate system of the original toric surface are displaced from each other by an angle ax of the cylinder axis, the approximate curvature Cp at (px, py, pz) can be used in the coordinate system of the original progressive refracting interface.

[Numerical Formula 19]

$px = \cos(ax)x_p - \sin(ax)y_p$ $py = \sin(ax)x_p + \cos(ax)y_p$ $pz = z_p$

The combination expression (1) has a slightly more calculation amount than the combination expression proposed in Patent Document 1. The internal progressive multifocal lens 1b of which eyeball-side refracting interface 2 is the combined refracting interface 14+15 composed of the toric surface expressed by the combination expression (1) and the progressive refracting interface can be reduced in the difference in magnification between the distance portion and the near portion and so the resulting blurring and distortion of an image can be significantly reduced.

When a progressive refracting interface having an astigmatism corrective characteristic is constructed by adding the value of the z-coordinate of the original progressive refracting interface having an eyesight corrective characteristic to the value of the z-coordinate for forming an original toric surface having an astigmatism corrective characteristic, it is difficult to obtain completely equal eyesight corrective and astigmatism corrective power to those of the conventional astigmatism-correcting progressive multifocal lens.

Also a progressive multifocal lens that has a progressive refracting interface in the object-side refracting interface or the eyeball-side refracting interface can be made thin by adding a prism with a base of 270-degree direction.

After the coordinates of the combined refracting interface of the progressive multifocal lens in which the progressive refracting interface is integrated with the toric surface has been obtained, the opposite surface of the lens in which one of the object-side refracting interface and the eyeball-side refracting interface is spherical or rotational-symmetry aspherical is cut, ground, or mirror-polished according to the coordinates with a numerically controlled polishing machine to form a combined refracting interface. The progressive multifocal lens of the present invention can thus be manufactured.

The procedure of calculating the combination expression (2) will now be described. Suppose interpolation with such a sine curve that a is obtained at zero degree, 180 degrees, and 360 degrees and b is obtained at 90 degrees and 270 degrees, shown in FIG. 2. This is expressed as

[Numerical Formula 20]

$$f(\theta) = b + \left(\frac{1 + \cos 2\theta}{2}\right)(a - b)$$

This formula is modified as

[Numerical Formula 21]

$$f(\theta) = b + \left(\frac{1 + \cos^2\theta - \sin^2\theta}{2}\right)(a - b)$$

$$= b + \left(\frac{\cos^2\theta + \sin^2\theta + \cos^2\theta - \sin^2\theta}{2}\right)(a - b)$$

$$= b + \left(\frac{2\cos^2\theta}{2}\right)(a - b) = b + \cos^2\theta(a - b)$$

$$= b + a\cos^2\theta - b\cos^2\theta$$

$$= a\cos^2\theta + b(1 - \cos^2\theta) = a\cos^2\theta + b\sin^2\theta$$

The formula is converted to the x- and y-coordinates as

[Numerical Formula 22]

$$\cos\theta = \frac{x}{\sqrt{x^2 + y^2}}, \sin\theta = \frac{y}{\sqrt{x^2 + y^2}}$$

Accordingly, expression (6) is obtained.

[Numerical Formula 23]

$$f(x, y) = \frac{ax^2 + by^2}{x^2 + y^2} \quad (6)$$

Interpolation between circular arcs in which the cross section along the cylinder axis and the cross section in the direction perpendicular to the cylinder axis are each in the form of a circular arc is as follows: In the xy-plane, the z-coordinate $z_x$ of point

[Numerical Formula 24]

$(\sqrt{x^2+y^2}, 0)$ and the z-coordinate $z_y$ of point

[Numerical Formula 25]

$(0, \sqrt{x^2+y^2})$ are interpolated with a sine curve. From expression (6), expression (7) is obtained.

[Numerical Formula 26]

$$z = \frac{z_x x^2 + z_y y^2}{x^2 + y^2} \quad (7)$$

Both of the cross sections of the xz-plane and the yz-plane are circular arcs. The circular arcs are expressed as

[Numerical Formula 27]

$$z_x = \frac{c_x x^2}{1 + \sqrt{1 - c_x^2 x^2}}$$

$$z_y = \frac{c_y y^2}{1 + \sqrt{1 - c_y^2 y^2}}$$

where $c_x$ is the reciprocal of the radius $R_x$ of the circular arc in the direction of the cylinder axis (x-axis), indicating the curvature in the direction of the cylinder axis and $c_y$ is the reciprocal of the radius $R_y$ of the circular arc in the direction (y-axis) perpendicular to the cylinder axis, indicating the curvature in the direction perpendicular to the cylinder axis. From the expression, the following expressions are obtained.

[Numerical Formula 28]

$$z_x = \frac{c_x(x^2 + y^2)}{1 + \sqrt{1 - c_x^2(x^2 + y^2)}}$$

$$z_y = \frac{c_y(x^2 + y^2)}{1 + \sqrt{1 - c_y^2(x^2 + y^2)}}$$

Substituting them into expression (7) gives expression (8).

[Numerical Formula 29]

$$z = \frac{c_x(x^2 + y^2)x^2}{\left(1 + \sqrt{1 - c_x^2(x^2 + y^2)}\right)(x^2 + y^2)} + \frac{c_y(x^2 + y^2)y^2}{\left(1 + \sqrt{1 - c_y^2(x^2 + y^2)}\right)(x^2 + y^2)} \quad (8)$$

$$= \frac{c_x x^2}{1 + \sqrt{1 - c_x^2(x^2 + y^2)}} + \frac{c_y y^2}{1 + \sqrt{1 - c_y^2(x^2 + y^2)}}$$

The surface expressed by expression (8) is the original toric surface. Combining $C_p$ to each of $c_x$ and $c_y$ gives combination expression (2).

[Numerical Formula 30]

$$z_p = \frac{(c_p + c_x)x^2}{1 + \sqrt{1 - (c_p + c_x)^2(x^2 + y^2)}} + \frac{(c_p + c_y)y^2}{1 + \sqrt{1 - (c_p + c_y)^2(x^2 + y^2)}}. \quad (2)$$

When the coordinate system of the original progressive refracting interface and the coordinate system of the original toric surface are displaced from each other by an angle αx of the cylinder axis, the approximate curvature Cp at (px, py, pz) can be used in the coordinate system of the original progressive refracting interface. The combination expression (2) has a slightly more calculation amount than the combination expression proposed in WO 97/19382. The internal progressive multifocal lens 1b of which eyeball-side refracting interface 2 is the combined refracting interface 14+15 composed of the toric surface expressed by the combination expression (2) and the progressive refracting interface can be reduced in the difference in magnification between the distance portion and the near portion and so the resulting blurring and distortion of an image can be significantly reduced.

When a progressive refracting interface having an astigmatism corrective characteristic is constructed by adding the value of the z-coordinate of the original progressive refracting interface having an eyesight corrective characteristic to the value of the z-coordinate for forming an original toric surface having an astigmatism corrective characteristic, it is difficult to obtain completely equal eyesight corrective and astigmatism corrective power to those of the conventional astigmatism-correcting progressive multifocal lens.

Also a progressive multifocal lens that has a progressive refracting interface in the object-side refracting interface or the eyeball-side refracting interface can be made thin by adding a prism with a base of 270-degree direction.

After the coordinates of the combined refracting interface of the progressive multifocal lens in which the progressive refracting interface is integrated with the toric surface has been obtained, the opposite surface of the lens in which one of the object-side refracting interface and the eyeball-side refracting interface is spherical or rotational-symmetry aspherical is cut, ground, or mirror-polished according to the coordinates with a numerically controlled polishing machine to form a combined refracting interface. The progressive multifocal lens of the present invention can thus be manufactured.

EMBODIMENTS

First Embodiment

The progressive multifocal lens of this embodiment is spherical on the side of an object and has a constant base curve of 4.00 D. The original progressive refracting interface before the toric surface is combined thereto is provided on the side of an eyeball, of which mean surface power is set to 4.00 D in a distance portion and 2.00 D in a near portion, and addition power is set to 2.00 D. The original toric surface has a cylinder axis of 90 degrees, a spherical power S of −2.00 D, and a cylindrical power C of −2.00 D. The original progressive refracting interface and the original toric surface are combined with combination expression (1) to obtain a combined refracting interface. The lens-center thickness t is 3.0 mm and the lend diameter d is 70.0 mm.

Figure 3:
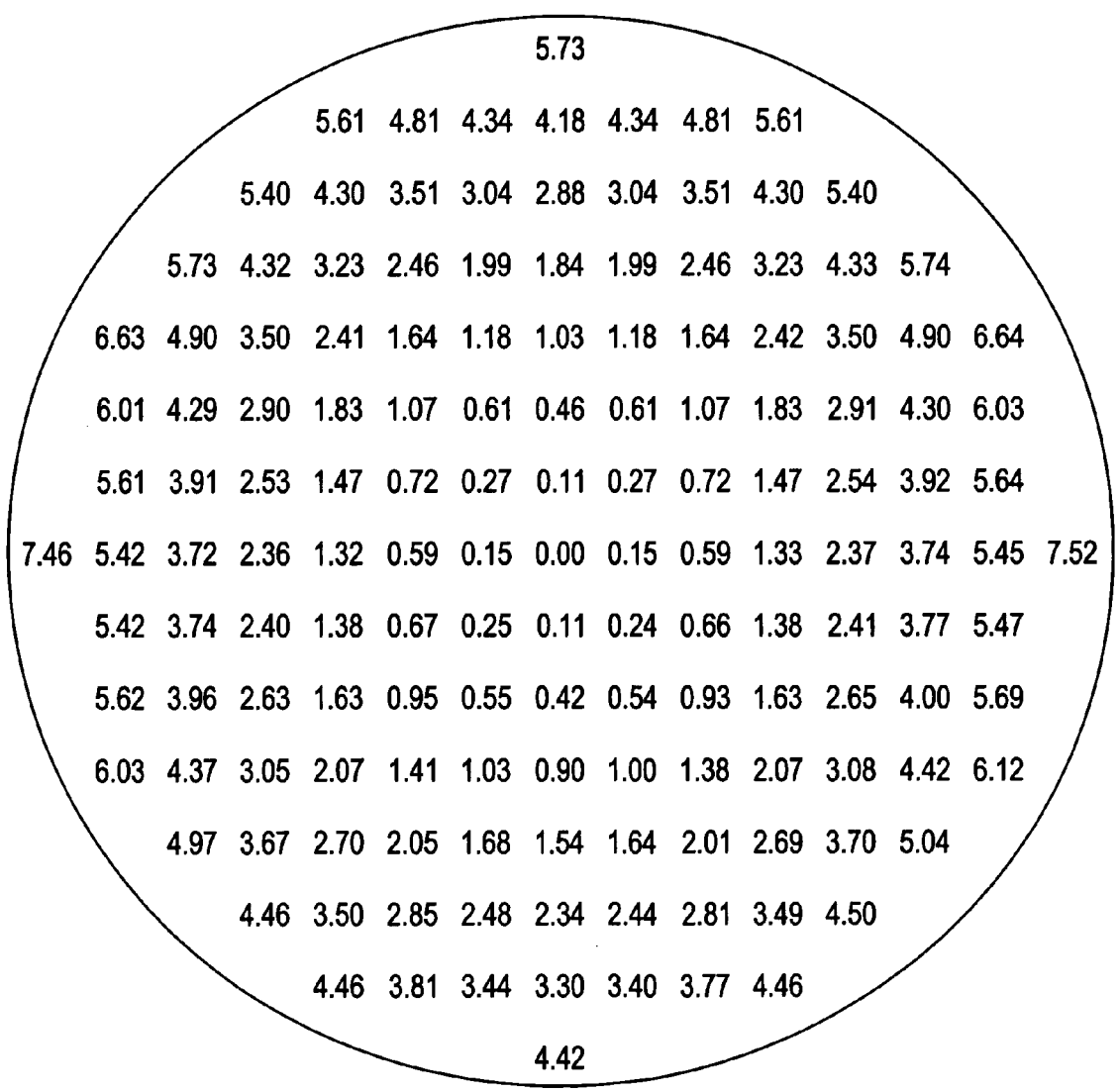
[FIG. 3]
Figure 4A:
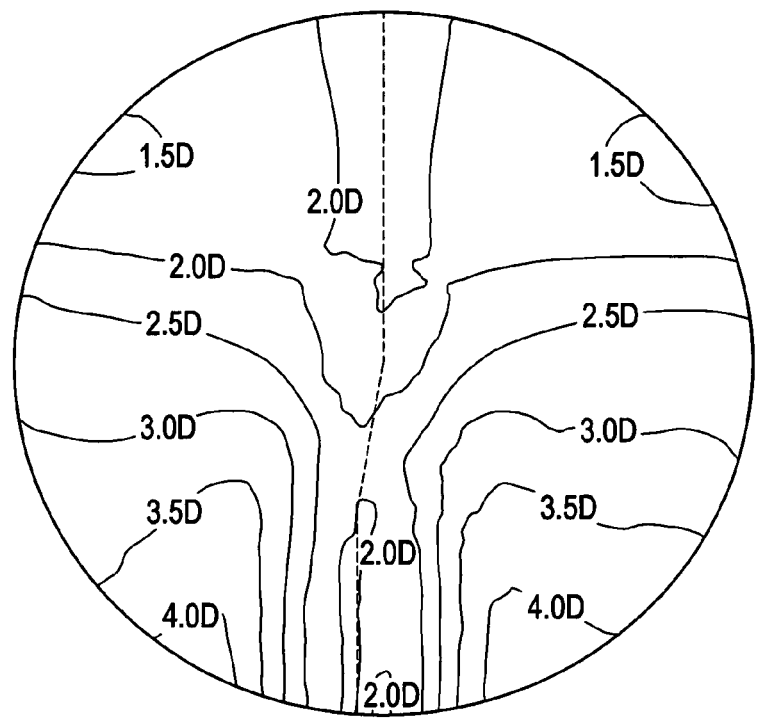
FIG. 4(a) is an astigmatism chart of a progressive multifocal lens having a progressive surface on the object side and a toric surface on the eyeball side.
Figure 4B:
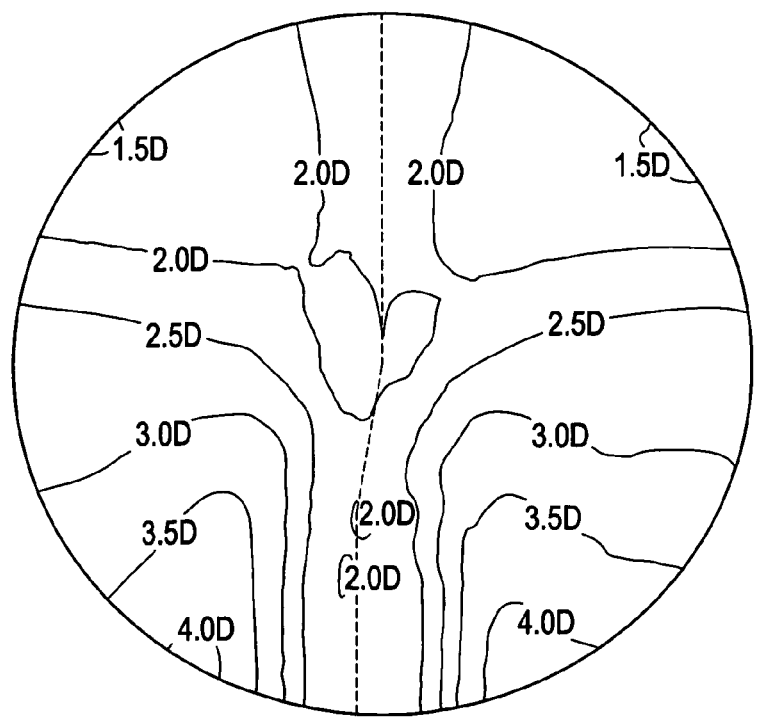
FIG. 4(b) is an astigmatism chart of the progressive multifocal lens of the first embodiment having a combination of a progressive surface and a toric surface on the eyeball side.

FIG. 3 shows the eyeball-side z-coordinate of the progressive multifocal lens of the first embodiment. FIG. 4(a) shows the astigmatism distribution of a conventional external progressive multifocal lens having a progressive surface on the outer side and a toric surface on the inner side. FIG. 4(b) shows the astigmatism distribution of the progressive multifocal lens having a combined refracting interface formed by combining the same progressive surface and the toric surface with combination expression (1) on the inner side.

FIG. 4 shows that the progressive multifocal lens of the first embodiment having a combined refracting interface formed in the inner surface by combining the progressive refracting interface and the toric surface with combination expression (1) has performance equal to that of the external progressive multifocal lens that has a progressive surface on the object side and a toric surface on the eyeball side.

Second Embodiment

The progressive multifocal lens of this embodiment is spherical on the side of an object and has a constant base curve of 4.00 D. The original progressive refracting interface before the toric surface is combined thereto is provided on the side of an eyeball, of which mean surface power is set to 4.00 D in a distance portion and 0.50 D in a near portion, and addition power is set to 3.50 D. The original toric surface has a cylinder axis of 45 degrees, a spherical power S of 0.00 D, and a cylindrical power C of −6.00 D. The original progressive refracting interface and the original toric surface are combined with combination expression (1) to obtain a combined refracting interface. The lens-center thickness t is 3.0 mm and the lens diameter d is 70.0 mm.

Figure 5:
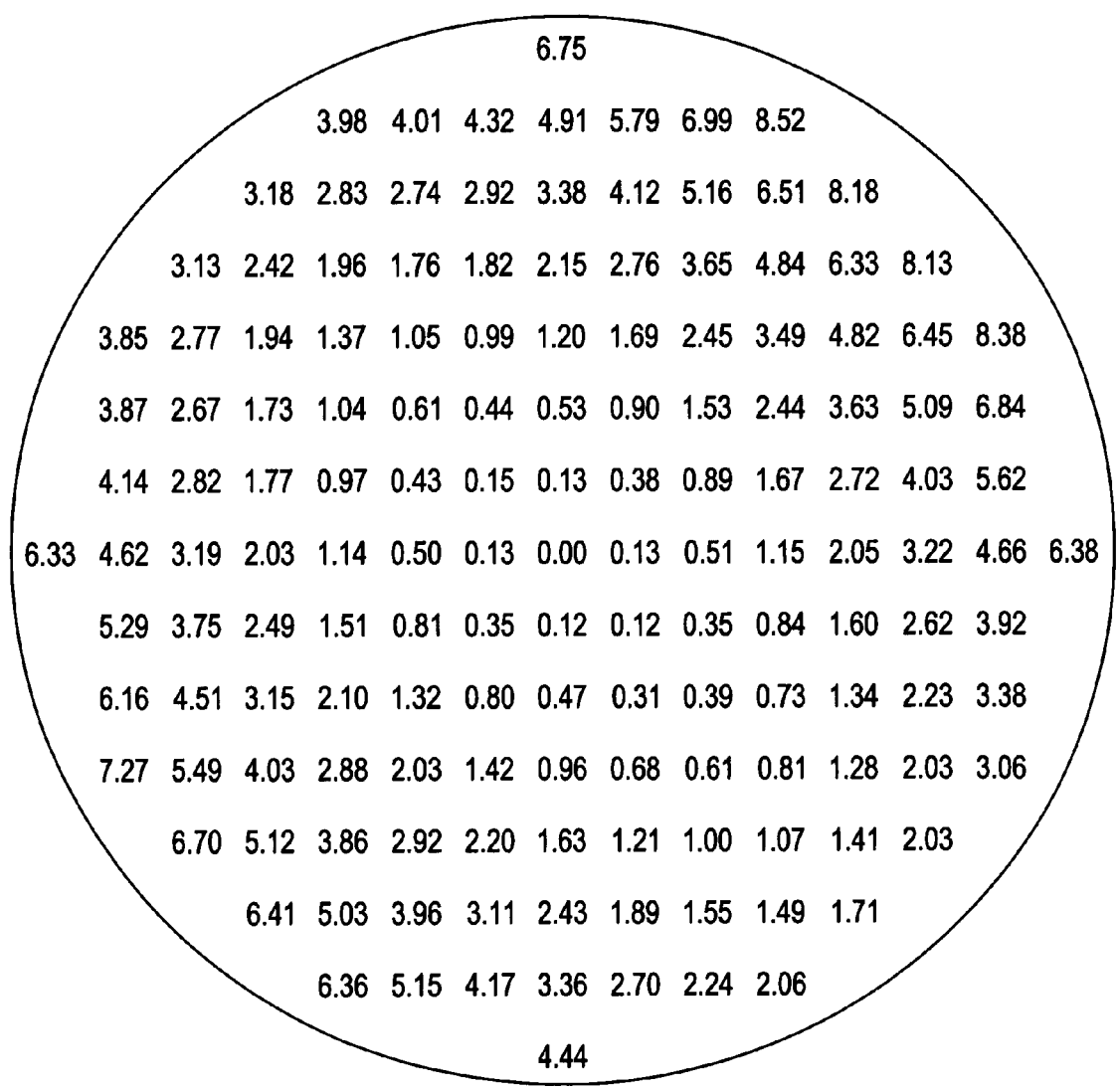
[FIG. 5]
Figure 6A:
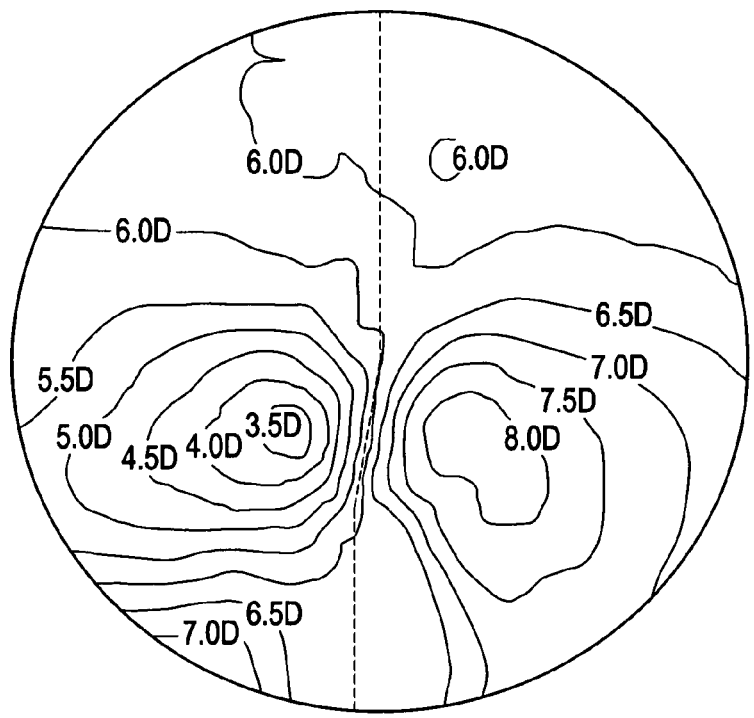
FIG. 6(a) is an astigmatism chart of a progressive multifocal lens having a progressive surface on the object side and a toric surface on the eyeball side.
Figure 6B:
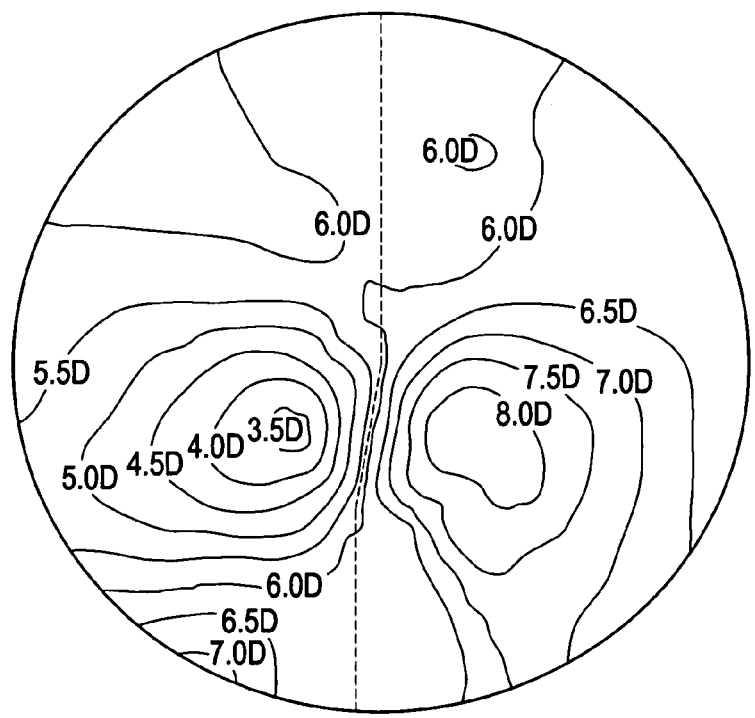
FIG. 6(b) is an astigmatism chart of the progressive multifocal lens of the second embodiment having a combination of a progressive surface and a toric surface on the eyeball side.

FIG. 5 shows the eyeball-side z-coordinate of the progressive multifocal lens of the second embodiment. FIG. 6(a) shows the astigmatism distribution of a conventional external progressive multifocal lens having a progressive surface on the object side and a toric surface on the eyeball side. FIG. 6(b) shows the astigmatism distribution of the progressive multifocal lens having a combined refracting interface formed by combining the same progressive surface and the toric surface with combination expression (1) on the eyeball side.

FIG. 6 shows that the progressive multifocal lens of the second embodiment having a combined refracting interface formed by combining the progressive refracting interface and the toric surface with combination expression (1) on the eyeball side has performance equal to that of the external progressive multifocal lens that has a progressive surface on the object side and has a toric surface on the eyeball side.

Third Embodiment

The progressive multifocal lens of this embodiment is spherical on the side of an object and has a constant base curve of 4.00 D. The original progressive refracting interface before the toric surface is combined thereto is provided on the side of an eyeball, of which mean surface power is set to 4.00 D in a distance portion and 2.00 D in a near portion, and addition power is set to 2.00 D. The original toric surface has a cylinder axis of 90 degrees, a spherical power S of −2.00 D, and a cylindrical power C of −2.00 D. The original progressive refracting interface and the original toric surface are combined with combination expression (2) to obtain a combined refracting interface. The lens-center thickness t is 3.0 mm and the lens diameter d is 70.0 mm.

Figure 7:
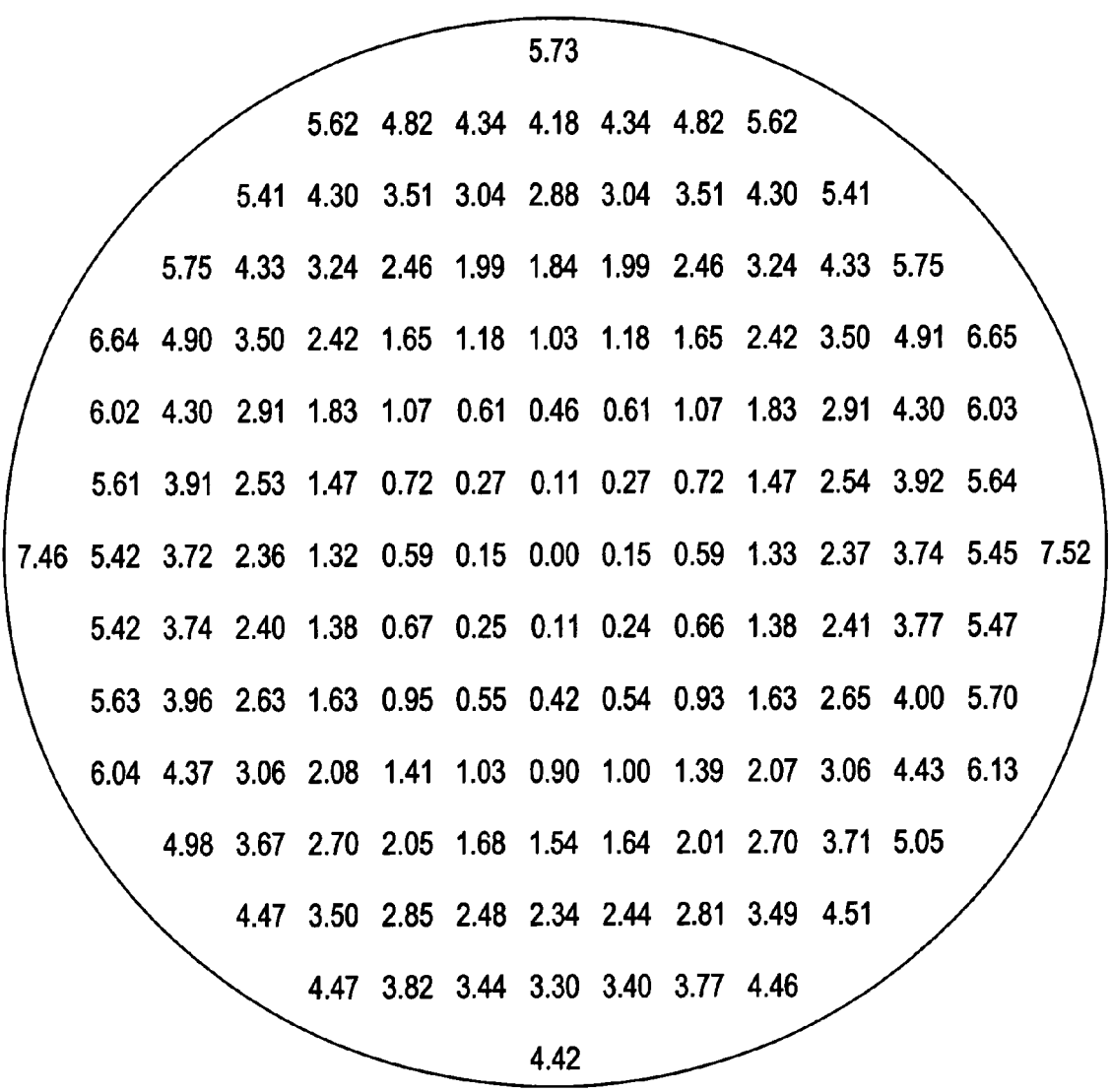
[FIG. 7]
Figure 8A:
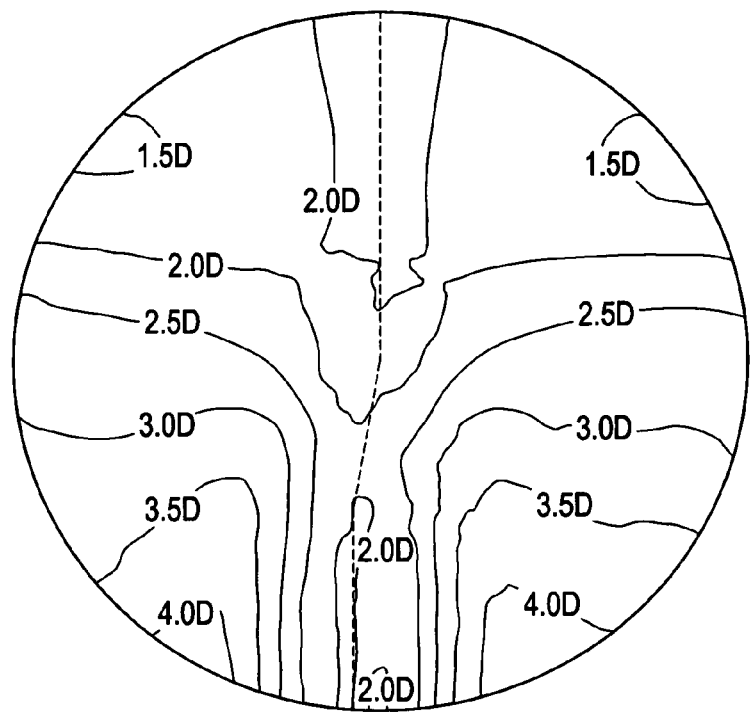
FIG. 8(a) is an astigmatism chart of a progressive multifocal lens having a progressive surface on the object side and a toric surface on the eyeball side.
Figure 8B:
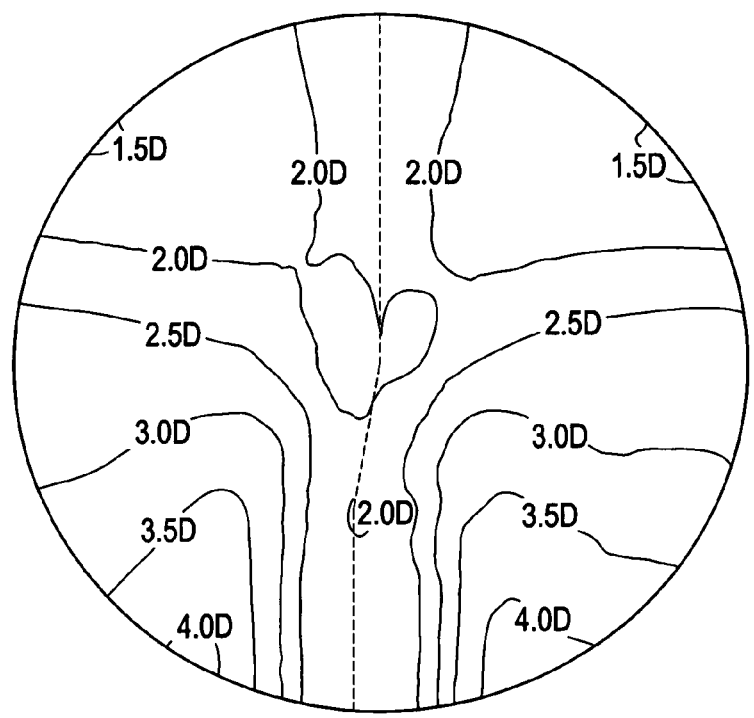
FIG. 8(b) is an astigmatism chart of the progressive multifocal lens of the third embodiment having a combination of a progressive surface and a toric surface on the eyeball side.

FIG. 7 shows the eyeball-side z-coordinate of the progressive multifocal lens of the third embodiment. FIG. 8(a) shows the astigmatism distribution of a conventional external progressive multifocal lens having a progressive surface on the outer side and a toric surface on the inner side. FIG. 8(b) shows the astigmatism distribution of the progressive multifocal lens having a combined refracting interface formed by combining the same progressive surface and the toric surface with combination expression (2) on the inner side.

FIG. 8 shows that the progressive multifocal lens of the third embodiment having a combined refracting interface formed by combining the progressive refracting interface and the toric surface with combination expression (2) in the inner surface has performance equal to that of the external progressive multifocal lens that has a progressive surface on the object side and has a toric surface on the eyeball side.

Fourth Embodiment

The progressive multifocal lens of this embodiment is spherical on the side of an object and has a constant base curve of 4.00 D. The original progressive refracting interface before the toric surface is combined thereto is provided on the side of an eyeball, of which mean surface power is set to 4.00 D in a distance portion and 0.50 D in a near portion, and addition power is set to 3.50 D. The original toric surface has a cylinder axis of 45 degrees, a spherical power S of 0.00 D, and a cylindrical power C of −6.00 D. The original progressive refracting interface and the original toric surface are combined with combination expression (2) to obtain a combined refracting interface. The lens-center thickness t is 3.0 mm and the lens diameter d is 70.0 mm.

Figure 9:
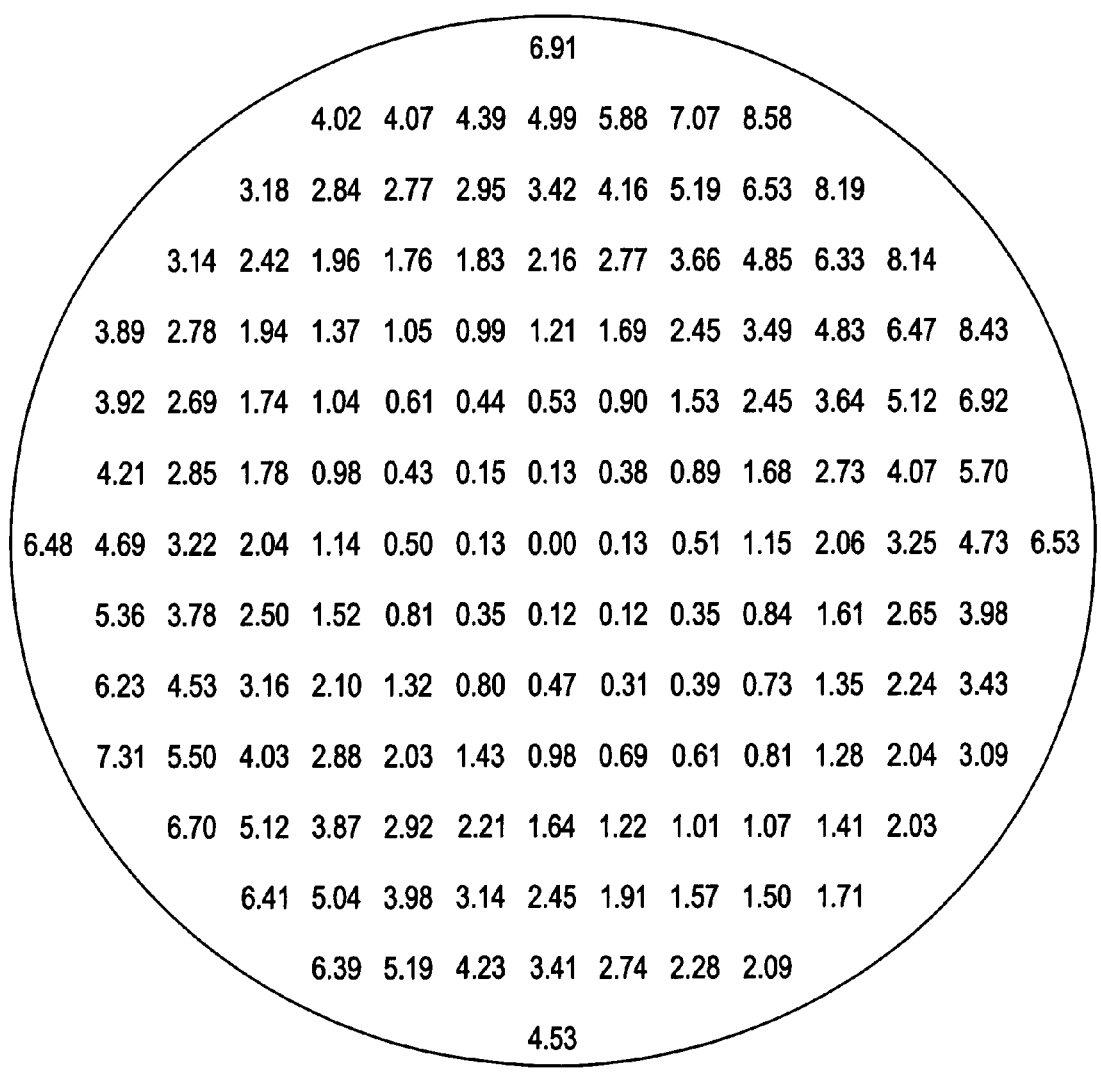
[FIG. 9]
Figure 10A:
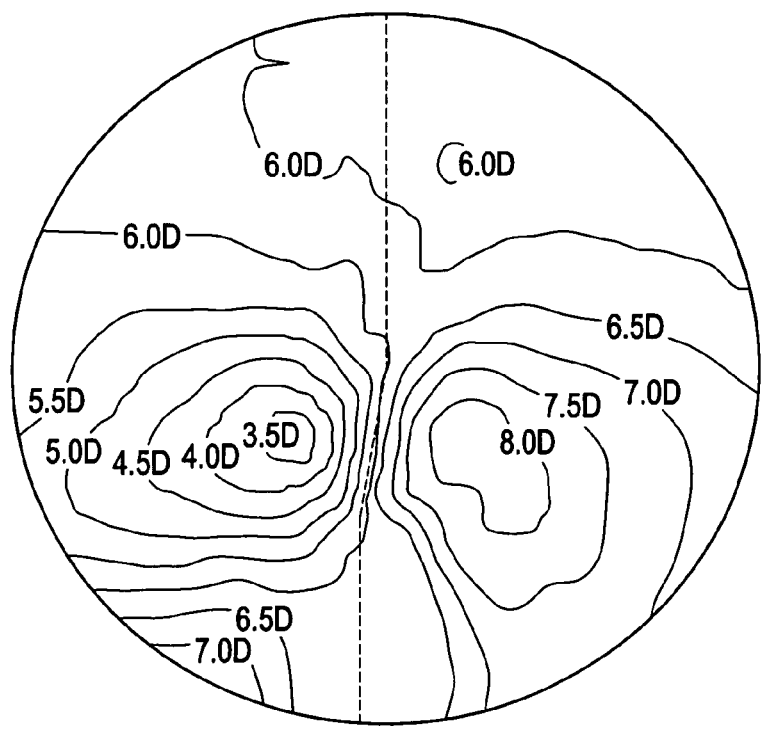
FIG. 10(a) is an astigmatism chart of a progressive multifocal lens having a progressive surface on the object side and a toric surface on the eyeball side.
Figure 10B:
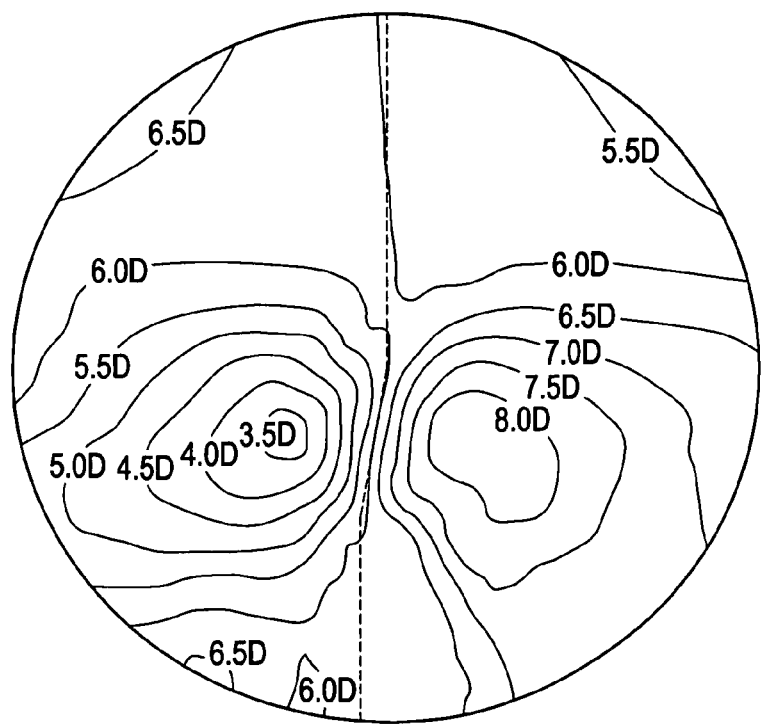
FIG. 10(b) is an astigmatism chart of the progressive multifocal lens of the fourth embodiment having a combination of a progressive surface and a toric surface on the eyeball side.
Figure 11A:
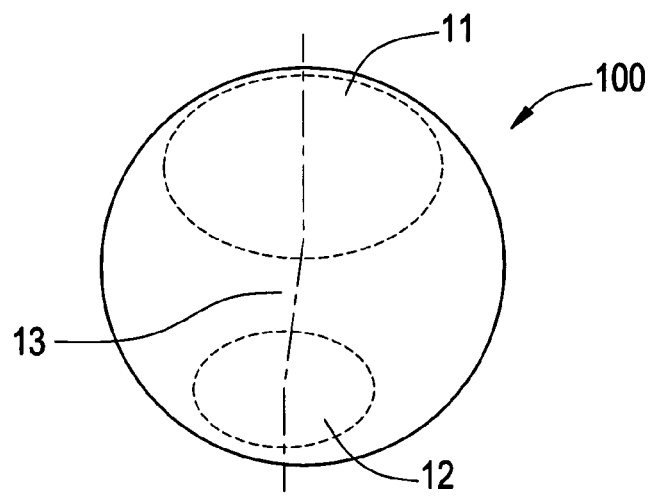
FIG. 11(a) is a front view.
Figure 11B:
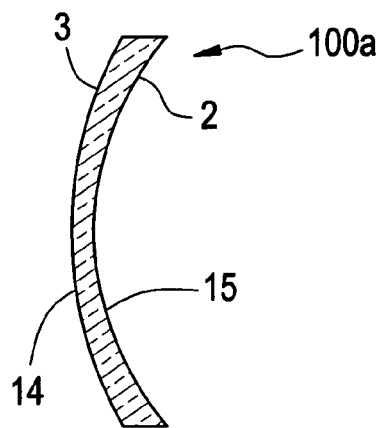
FIG. 11(b) is a cross-sectional view of an object-side refracting interface having a progressive refracting interface.
Figure 11C:
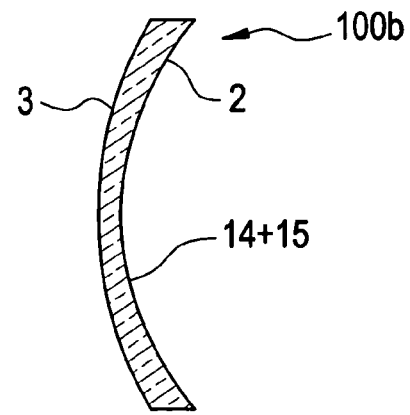
FIG. 11(c) is a cross-sectional view of an eyeball-side refracting interface having a progressive refracting interface.

FIG. 9 shows the eyeball-side z-coordinate of the progressive multifocal lens of the fourth embodiment. FIG. 10(a) shows the astigmatism distribution of a conventional external progressive multifocal lens having a progressive surface on the object side and a toric surface on the eyeball side. FIG. 10(b) shows the astigmatism distribution of the progressive multifocal lens having a combined refracting interface formed by combining the same progressive surface and the toric surface with combination expression (2) on the eyeball side.

FIG. 10 shows that the progressive multifocal lens of the fourth embodiment having a combined refracting interface formed by combining the progressive refracting interface and the toric surface with combination expression (2) on the eyeball side has performance equal to that of the external progressive multifocal lens that has a progressive surface on the object side and a toric surface on the eyeball side.

The progressive multifocal lens of the invention has a combined refracting interface composed of a progressive refracting interface and a toric surface, thus being capable of providing eyesight corrective power and astigmatism corrective power to one of the object-side and eyeball-side refracting interfaces.

The method for designing the progressive multifocal lens of the invention is capable of designing a progressive multifocal lens having a combined refracting interface composed of a progressive refracting interface and a toric surface on one of the object-side and eyeball-side refracting interfaces.

The invention claimed is:

1. A progressive multifocal lens for correcting eyesight comprising:
    a progressive refracting interface, said progressive refracting interface is located on a side of an eyeball or on a side of an object,
    wherein the progressive refracting interface comprises:
        a distance portion,
        a near portion with different refractive powers, and
        a progressive portion of which refractive power varies progressively therebetween, wherein the eyeball-side refracting interface or the object-side refracting interface is a combined refracting interface comprising an original progressive refracting interface set only to exhibit a desired eyesight corrective characteristic and an original toric surface set only to exhibit a desired astigmatism corrective characteristic, wherein, when z-axis is an axis passing through the center of the progressive refracting interface from the object toward the eyeball, x-axis is cylinder axis of the original toric surface, and y-axis is an axis perpendicular to the x-axis and the z-axis, value $z_p$ in any point P ($x_p$, $y_p$, $z_p$) in the combined refracting interface is expressed by a first expression (1) or a second expression (2) by using approximate curvature Cp of the original progressive refracting interface, curvature Cx in the x-axis direction, and curvature Cy in the y-axis direction, wherein the first expression (1) is expressed as $$z_p = \frac{(c_p + c_x)x^2 + (c_p + c_y)y^2}{1 + \sqrt{1 - \frac{((c_p + c_x)x^2 + (c_p + c_y)y^2)^2}{x^2 + y^2}}} \quad (1)$$

and
wherein the second expression (2) is expressed as $$z_p = \frac{(c_p + c_x)x^2}{1 + \sqrt{1 - (c_p + c_x)^2(x^2 + y^2)}} + \frac{(c_p + c_y)y^2}{1 + \sqrt{1 - (c_p + c_y)^2(x^2 + y^2)}}. \quad (2)$$

2. A progressive multifocal lens according to claim 1, wherein an eyeball-side refracting interface surface or an object-side refracting interface surface opposite to the surface having the combined refracting interface is spherical or rotation-symmetry aspherical in shape.

3. A method for designing a progressive multifocal lens for correcting eyesight having a progressive refracting interface on a side of an eyeball or on a side of an object, the progressive refracting interface comprising a distance portion, a near portion with different refractive powers, and a progressive portion of which refractive power varies progressively therebetween, the method comprising:

obtaining an original progressive refracting interface only in order that the eyeball-side refracting interface or the object-side refracting interface exhibits an eyesight corrective characteristic;

obtaining an original toric surface only in order that the eyeball-side refracting interface or the object-side refracting interface exhibits a desired astigmatism-corrective-characteristic; and obtaining a combined refracting interface as the eyeball-side refracting interface or the object-side refracting interface, the combined refracting interface comprising the original progressive refracting interface set only to exhibit a desired eyesight corrective characteristic and the original toric surface set only to exhibit a desired astigmatism corrective characteristic, wherein in the obtaining of the combined refracting interface, when z-axis is an axis passing through the center of the progressive refracting interface from the object toward the eyeball, x-axis is the cylinder axis of the original toric surface, and y-axis is an axis perpendicular to the x-axis and the z-axis, value $z_p$ in any point P ($x_p$, $y_p$, $z_p$) in the combined refracting interface is obtained by a first expression (1) or a second expression (2) by using an approximate curvature Cp of the original progressive refracting interface, a curvature Cx in the x-axis direction, and a curvature Cy in the y-axis direction, wherein the first expression (1) is expressed as $$z_p = \frac{(c_p + c_x)x^2 + (c_p + c_y)y^2}{1 + \sqrt{1 - \frac{((c_p + c_x)x^2 + (c_p + c_y)y^2)^2}{x^2 + y^2}}} \quad (1)$$

wherein the second expression (2) is expressed as $$z_p = \frac{(c_p + c_x)x^2}{1 + \sqrt{1 - (c_p + c_x)^2(x^2 + y^2)}} + \frac{(c_p + c_y)y^2}{1 + \sqrt{1 - (c_p + c_y)^2(x^2 + y^2)}}. \quad (2)$$

4. The progressive multifocal lens according to claim 1, wherein, the value $z_p$ in any point P ($x_p$, $y_p$, $z_p$) in the combined refracting interface is expressed by the second expression (2).

5. The progressive multifocal lens according to claim 1, wherein the object-side has the combined refracting interface and the eyeball-side surface is spherical in shape.

6. The progressive multifocal lens according to claim 1, wherein an eyeball-side refracting interface surface or an object-side refracting interface surface opposite to the surface having the combined refracting interface is rotation-symmetry aspherical in shape.

7. The method for designing a progressive multifocal lens according to claim 3, wherein the original toric surface is obtained by a third expression expressed as:

$$z = \frac{c_x x^2 + c_y y^2}{1 + \sqrt{1 - \frac{(c_x x^2 + c_y y^2)^2}{x^2 + y^2}}}$$

wherein z represents a circular arc of the original toric surface.

8. The method for designing a progressive multifocal lens according to claim 3, wherein the original toric surface is obtained by a fourth expression expressed as:

$$z = \frac{c_x x^2}{1 + \sqrt{1 - c_x^2(x^2 + y^2)}} + \frac{c_y y^2}{1 + \sqrt{1 - c_y^2(x^2 + y^2)}}.$$

wherein z represents a circular arc of the original toric surface.

* * * * *